March 28, 1961

T. H. STIEBEL 2,977,456

MINIATURE IMMERSION HEATERS WITH WATERTIGHT
HANDLES ENCLOSING SWITCHING MEANS

Filed May 13, 1959

INVENTOR
THEODOR H. STIEBEL
BY
ATTORNEY

March 28, 1961  T. H. STIEBEL  2,977,456
MINIATURE IMMERSION HEATERS WITH WATERTIGHT
HANDLES ENCLOSING SWITCHING MEANS
Filed May 13, 1959  2 Sheets-Sheet 2
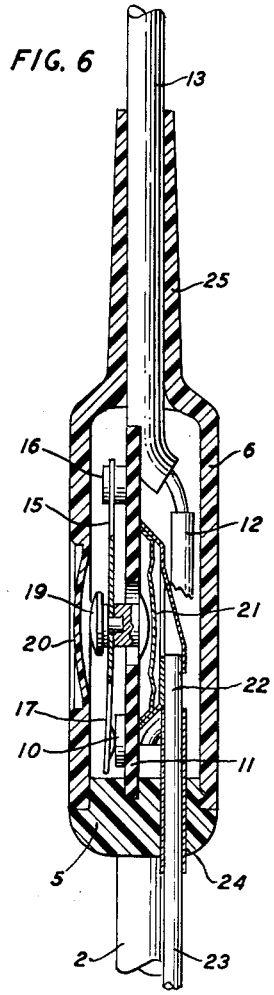
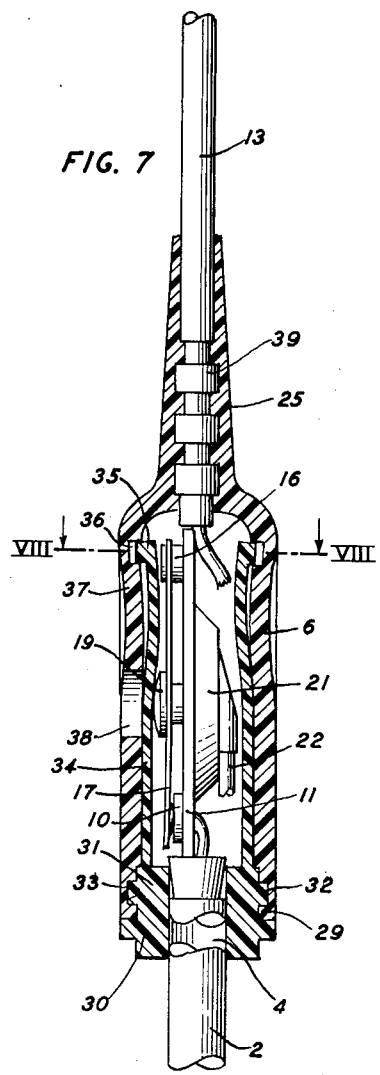
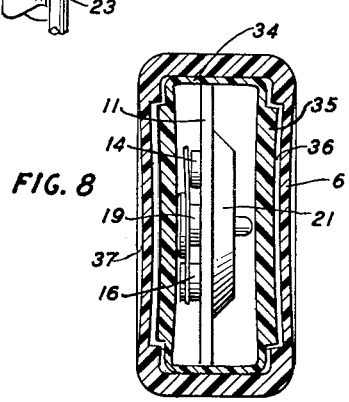
INVENTOR
THEODOR H. STIEBEL
BY
ATTORNEY

2,977,456
Patented Mar. 28, 1961

2,977,456

MINIATURE IMMERSION HEATERS WITH WATERTIGHT HANDLES ENCLOSING SWITCHING MEANS

Theodor H. Stiebel, Luchtringer Weg 11, Holzminden (Weser), Germany

Filed May 13, 1959, Ser. No. 812,935

8 Claims. (Cl. 219—41)

This invention relates to immersion heaters, particularly of the miniature type having handles which are hollow, house a switch, and are of bell-shape with the open end thereof sealed by a cover-plate from which the immersion heater per se projects, the near ends of the heater shanks being embedded in the cover-plate.

An object of the invention is to provide a miniature immersion heater having a rigid handle casing for immersion heaters of synthetic material and of one-piece construction in the form of an elongated bell having a single opening at one end with a cover-plate, also of synthetic material, sealing the opening watertight, all watertight sealing thereof being without the use of pressure screws, packing rings, or the like.

A further object of the invention is to provide an immersion heater having a watertight handle with a single bell-shaped member forming the housing for the switch of the immersion heater, the switch requiring no opening through the housing for it to be set in its line connecting condition, and thus eliminating the need for sealing by the use of packing rings, elastic sheathing, or the like, held in pressure or tension by metal parts.

A further object is to make a portable immersion heater with a watertight handle having a switch housed therein, the handle being of a material which is adequately rigid at useful wall thicknesses but relatively flexible at lesser, but still useful, thicknesses so that the switch may be wholly enclosed within the handle and be actuated from outside the handle through the wall thereof.

A further object is to provide a portable immersion heater having a handle housing all elements of a line switch and a thermally responsive switch opening means, which may be disassembled for adjustment and replacement of parts thereof, and readily reassembled watertight after disassembly.

Prior art miniature immersion heaters of the type including a handle of two-part shell construction for housing the switch of the heater as well as for grasping the heater, have the disadvantage that the handle is made of material which is rigid enough to retain the requisite threading, housing shape, etc., and must be rendered water-tight by packing rings, rubber sheathing, screw clamping rings, etc. In such structures, the materials were non-flexible and brittle, thus increasing the likelihood of breakage, and at the same time had to be used in thicknesses which increased both the weight and the cost, particularly of miniature heaters. In recognition of these shortcomings, more recent attempts were directed to making the handles of relatively thick-walled rubber, but such construction was possible only at the sacrifice of the disassemblability of the heaters in that it required vulcanization of the handle to the supply cord. In numerous situations, however, the matter of disassembling the heater handles cannot be lightly disregarded, particularly where switching elements are disposed within the handle which are controlled by an externally positioned thermally responsive structure requiring differing adjustments from one field of application to another.

I accomplish the foregoing, and other, objects by providing a bell-shaped immersion heater handle casing which satisfies the requirements of being watertight, relatively rigid, of light weight, and capable of facile disassembly, and at the same time eliminates all the above mentioned drawbacks, which has a cover-plate at its open, heating element, side and has the supply lead passages through its opposite and closed end, both the bell and cover-plate being made of a synthetic material such as polyethylene, branched high-pressure polyethylene, low-pressure polyethylene, polypropylene, or other synthetics of similar properties, the bell having a normal wall thickness of about 2 mm. at its main regions, at which thickness these materials are practically not flexible, thus obtaining with the necessary lightness adequate rigidity for supporting the heating element and the electrical contacts within the handle, while in the region of the opening for inserting the cover-plate, as also in the region where the supply wires pass through the handle, the handle wall is of sufficient lesser thickness as to have a perceptible, useful flexibility and elasticity, being, for example, of a thickness of about 1 to 1.5 mm.

In a preferred embodiment, the handle of the miniature immersion heater of my invention has a hollow, elongated and necklike extension also of such lesser wall thickness at the region of passage of the line conductors therethrough, of which extension the longitudinal bores are congruent with the conductor cross-section and are of the same, or somewhat smaller, slightly tapered cross-section for their entire lengths, while the outer surface of the insertable portion of the detachable cover-plate may be provided with one or more peripheral projections, each of which on insertion into the end aperture of the handle, engages and locks with a corresponding slot, groove or detent, either of the same size or somewhat narrower, or may be divergent in the direction toward the end opening of the handle; the portions of the handle wall defining the opening being flexible to a required extent by being, as above stated, of lesser thickness, for example, 1.0 to 1.5 mm.

The elongated necklike extension of the handle, which according to the invention, may further be provided with internal projections to effect labyrinth sealing of the supply cables thereinto, provides not only a longer and more effective compression surface between the handle and the cables to provide the necessary watertightness, but also takes over the function of relieving strain on the electrical conductors within the handle as a result of its greater elasticity due to its lesser wall thickness. Furthermore, abrasion of the electrical cord on an otherwise sharp-edged, non-elastic line conductor aperture of the handle is prevented on improper manipulation of the handle and heater. While the just mentioned handles are watertight and can be disassembled and reassembled, they cannot be disassembled manually but only with the use of tools. The construction is thus of such type as to avoid any danger of contact with current-carrying parts, as is required by existing safety codes.

This further requirement of disassemblability can also be met, firstly, by the selection for the handle of a synthetic material which is non-flexible, or but slightly flexible, at certain thicknesses and readily flexible at lesser wall thicknesses; and secondly, by the provision of a collar or sleeve extension on the insertion side of the cover-plate of appropriate dimensions and appropriately lesser wall thickness, which extension is provided at its free end with slots or projections engageable into corresponding detents or grooves in the handle, locking the extension to the handle at both end regions thereof.

Finally, the immersion heater shanks may be rigidly sealed with an adhesive into the cover-plate, and the latter in turn similarly sealed into the handle open end.

Even in such case the handle of the invention is designatable "disassemblable" in that the handle may be cut open, removed and replaced, or parts replaced, without injuring the connecting wires or other parts, and without the use of tools, expert help, or prior training.

Where a switch to control the heating current, which is manually operable to re-connect the line current, is to be housed within the handle in such manner that the element to be manually actuated does not extend through the wall of the handle, it is prior known, but relatively difficult of execution in practice, to provide the housing wall with a soft material in the region of the operating button. In the immersion heater of the instant invention, however, the entire handle and the integral elongated extension are of the same material with the thickness of its wall in the environs of the operating button decreased, preferably to a thickness of about 0.5 mm., so that the handle casing is deformable at this region, enabling operation of the switch element positioned therebelow by thumb pressure. An even simpler solution results when the open ended sleeve integral with the cover plate insertable into the handle casing, is made of a synthetic material which may be rendered bend-resistant by appropriate dimensioning of its wall thickness, serves as the carrier for the switch mounting board, and/or has an aperture in the region of the manually operable pressure button, while the synthetic material handle casing per se is made to have an appropriate, and preferably uniform, flexibility for both sealing the line cord watertight to the handle casing and, by the thinness of its wall, permits manual operation of the switch element by thumb-pressure thereon.

The foregoing, and other, objects and features of this invention will more readily appear from the following description of two illustrative embodiments of the immersion heater each with a handle of synthetic material, when read in conjunction with the appended drawing, in which.

Figure 1:
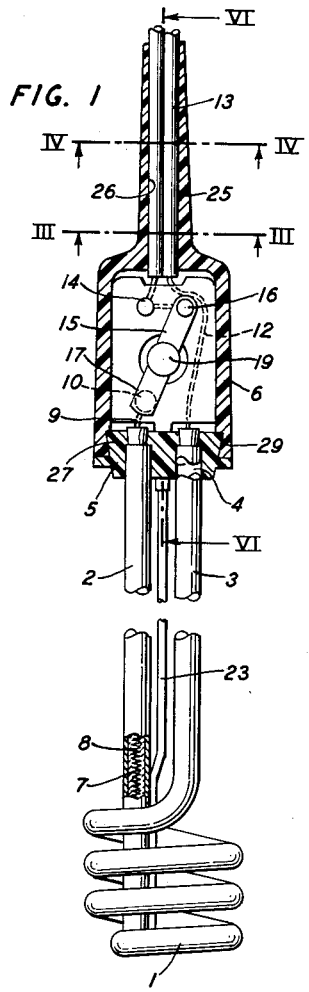
Figure 1 is a longitudinal plan view, partially in section and broken away, of a first embodiment illustrative of the invention.
Figure 2:
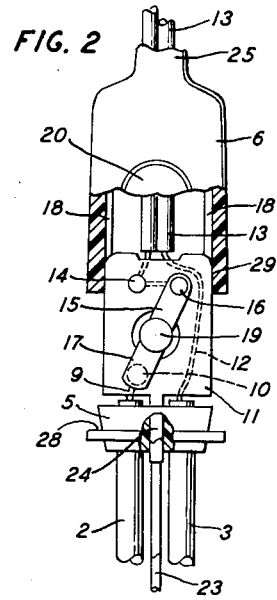
Figure 2 is a longitudinal plan view, similar to Figure 1, showing the handle housing in the process of being assembled to the cover-plate.
Figure 3:
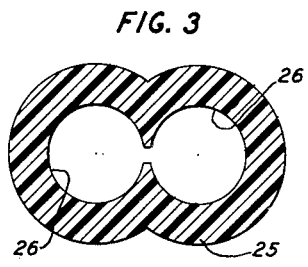
Figure 4:
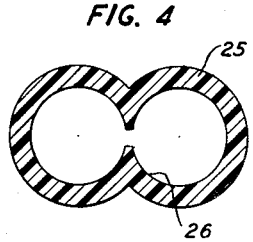
Figure 5:
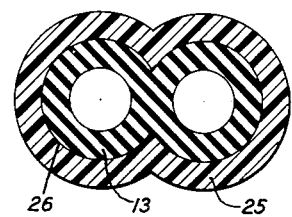

Figures 3 and 4 sections on lines III—III and IV—IV, respectively, of Figure 1 before the two-conductor cord is pulled therethrough;

Figure 5 the section of line III—III after the cord is pulled therethrough;

Figure 6 a section along line VI—VI of Figure 1 with the heater switch closed;

Figure 7 a longitudinal elevational view, partially in section and broken away, of a second embodiment of the handle according to the instant invention; and Figure 8 is an enlarged section of Figure 7 along line VIII—VIII.

The miniature immersion heater of Figure 1 comprises a heating element 1, of any desired shape such as the open helix shown, of which the unheated end regions or shanks 2 and 3 are sealed into a pair of apertures 4 defined in a cover-plate 5 and tightly held thereby. The shanks 2 and 3 preferably include a bend at the region thereof adjacent the cover-plate, so that in use the heater per se will be substantially in vertical position while the handle is horizontal or at an upward angle from the horizontal. The cover-plate 5 of a synthetic material, as above mentioned, and a thickness of some 9.00 mm. to render it sufficiently stiff, fits the end opening of a bell-shaped casing 6 constituting the handle of the immersion heater, within the hollow interior of which a line switch and a thermally responsive switch disconnecting means are housed, and through which the necessary electrical conductors pass. In the immersion heater per se a heating wire 7 is embedded in a mass of electrically insulating, but heat conducting, material 8 packed into the heat conducting tubing 1, 2 and 3. One end of the high resistance wire 7 is connected by conductor 9 to a fixed strip terminal 10 supported on an insulating board 11, while the other end of the high resistance wire is connected by conductor 12, passing below the board through the cavity of handle 6, to one conductor of the line supply cord 13.

The other conductor of line supply cord 13 is connected to a fixed terminal 14 on insulating board 11. On the board, a conductive bridge 15 extends diagonally across board 11 and casing 6, and is of pretensioned spring plate with one end affixed to a fixed terminal 16, electrically connected to terminal 14, and with its other end 17 movable to provide a conductive contact engageable to the end of a conductive strip terminal 10 remote from the end region thereof connected to conductor 9. The tension imparted to spring conductive bridge 15 is such that it is biased to engage strip terminal 10, thus closing the circuit from the line to the heating element. The insulating board is supported by a pair of directly opposite longitudinal grooves 18, in the interior faces of the longitudinal walls of casing 6.

A button 19 of material both electrically and thermally non-conductive, is disposed in the central portion of bridge 15 and registers above the bridge with a disk-shaped, thinned, portion 20 of the wall of handle casing 6. The normal thickness of the walls of casing 6, which is of polyethylene or other synthetic material having like and similar properties, as above mentioned, is about 2.0 mm., a thickness which is adequate to provide the necessary stiffness and rigidity, together with resistance to bending or deformation of the handle casing. In the thinned portion 20 of the casing wall, however, the thickness is as little as 0.5 mm., at which thickness the polyethylene, or similar material, is highly elastic and can be displaced a relatively large distance by the application of thumb pressure.

As shown most clearly in Figure 6, depicting the switch in its normal closed position, the thinned region 20 may be given a curvature such that its surface is convex upwardly and is spaced from the upper surface of button 19. The button extends through the bridge 15 toward, but with its lower end spaced from, a flexible diaphragm 21 constituting a wall of an expansion chamber 22. Heat responsive probe 23, connected in heat transferring relation with heating coil 1 at its free end, passes through the cover plate 5 by way of an aperture 24 closely and tightly fitted into the interior of handle 6 below board 11, and opens into expansion chamber 22, having diaphragm 21 as its wall facing the button 19. Probe 23 contains an adequate quantity of either a thermally expanding liquid or a liquid which evaporates with increasing temperature within the range of interest, and expands or evaporates sufficiently so that when the liquid, into which the immersion heater is immersed, comes to the desired elevated temperature, for example at which it boils, sufficient pressure is exerted on diaphragm 21 to engage it with the bottom of button 19, deflecting conductive bridge 15 upwardly to remove movable contact 17 from conductive strip 10, thereby opening the switch. Diaphragm 21 is preferably of the snap actuation type, its central portion being concave outwardly when button 19 has been reset and the pressure, if any, applied to the diaphragm is due to the heater, and the liquid in which it may be immersed, being at or about room temperature. When, however, the heater is at the predetermined high temperature, as communicated by the probe 23, the pressure on the diaphragm snaps the diaphragm to the convex outwardly position, opening the switch as stated. Obviously, the metal diaphragm 21 will remain in such convex outwardly position even though now the heater cools, and the switch will not be reclosed until thinned wall region 20 is depressed sufficiently to snap diaphragm back to its concave outwardly position by way of button 19. With the switch closed, the ends of button 19 are both spaced from the thinned wall region and the diaphragm, respectively, as clearly shown in Figure 6. While the width of the gap between the bottom and diaphragm need not be of a precisely predetermined magnitude, it should be such as to serve the two-fold purpose of not permitting a possible lifting of the button by the diaphragm for perhaps minor upward movements of the diaphragm before the snap action occurs, and to make certain that in the connecting position of the switch, the pretensioned bridge 15 remains at all times, prior to disconnect, unobstructed so that all of movable contact 17 rests on, and makes intimate contact with, strip terminal 10.

As above stated, the wall thickness of casing 6 at its main regions is about 2.0 mm. However, the wall thickness of its integral, neck-like, annular extension 25 tapering convergingly outward from the closed end of the bell-shaped handle casing 6, is sufficiently less than usual to give it elasticity, and decreases in the outward direction toward its free end, as is revealed on a comparison of the sections thereof of Figures 3 and 4, with the diameters of the bores 26 therethrough for the line conductors 13 being somewhat less than the outside diameters of such conductors. Thus, when the conductors 13 are pulled through the bores, these conductors are tightly held and sealed watertight therein, and the walls of the extension take up any pulling forces on the conductors. This is shown by way of example in the section of Figure 5, which, on comparison with Figure 3, shows how the walls of extension 25 have been expanded with the pulling of line conductors 13 through its bores 26. As a result of the decreasing wall thickness toward the free end, handle extension 25 is increasing laterally flexible and thus simultaneously serves as a conductor anti-kinking and anti-abrasion element.

Cover plate 5, as above stated, fits the open end of handle casing 6 and is fastened watertight thereto by an adhesive of any appropriate kind. It has an integral extension 27 for insertion into the casing interior, which may be of uniform dimensions or may taper divergently its length toward its face inwardly of the casing to provide a very tight fit, of which extension the depth of insertion is controlled by the peripheral shoulder 28 formed between the extension and the plate. The external dimensions of the extension 27 are somewhat in excess of the corresponding dimensions of the open end region 29 of casing 6. The wall thickness of the open end region 29, for about the length to which cover plate extension 27 can be inserted into the casing opening, is about 1.5 mm., that is, of a thickness at which the synthetic material of the casing is perceptibly elastic. Thus, since the area of the casing opening defined thereby is less than the area of the insertable extension of the plate, to insert the extension into the opening, flexible wall region 29 of the casing opening is expanded somewhat and then permitted to contract to tension itself tightly about, and form a watertight seal with, extension 27.

In the second illustrative embodiment of the immersion heater handle of my present invention shown in Figures 7 and 8, like elements are referenced by the same characters. Broadly stated, handle casing 6 and extension 25 of this embodiment differ from those of the Figure 1 embodiment internally only, with the switch assembly on board 11 identical, and incorporating modifications mainly in respect of the cover-plate. Cover-plate 30 of this second embodiment, like cover-plate 5, is of a synthetic material, for example, polyethylene or one with similar properties, having integral extension 31 provided with one or more peripheral ribs 32 on its external surface. Ribs 32 engage with grooves 33 in the inner surface of the casing end portion 20 defining the opening of the handle casing, the grooves locally reducing the resistance to bending of the casing wall to permit expansion of the wall when inserting extension 31 into the opening, the casing wall region applying itself upon completion of the insertion tightly and under tension about the projection and its ribs. As in the case of the dimensions of extension 27 of cover-plate 5, the outside dimensions of extension 31 are somewhat greater than the corresponding dimensions of the end region of opening 29 of the handle casing, and similarly the outside dimensions of ribs 32 may be greater than the root dimensions of grooves 33, to assure a tight seal between the parts. In addition, extension 31 has integral therewith an elongated sleeve 34 of a length substantially equal to the length of the cavity within handle casing 6. Sleeve 34 at its remote end is so preformed that its broader faces converge somewhat to reduce the transverse dimension between such two opposite broader faces. Each broad face of the sleeve 34 at the remote end is provided with a projection 35 extending substantially the width of such face and adapted to position itself in a corresponding groove 36 in the inner broad wall of the casing 6. The broad surfaces of casing 6 in the region just ahead of grooves 36 are dished inwardly and laterally of the casing exterior, as shown at 36, so that if it becomes necessary to remove the cover 30 with the sleeve 34, the application of finger pressure to regions 37 will deflect projections 35 toward each other and out of grooves 36. The wall of one of the broader faces of sleeve 34 defines an aperture 38 registering with switch button 19, the aperture being of sufficient area not to impede actuation of the button either by way of thinned wall portion 20 or by diaphragm 21. The thickness of the walls of sleeve 34 may be relatively thin as compared to the handle casing wall, as shown in Figure 7, and hence only the sleeve is relatively elastic. In such case, as in the first embodiment, the handle wall region 20 at the button is thinned to provide flexibility for operating the button. The wall thickness of sleeve 34 may, however, be the same as the wall thickness of handle 6, that is, each of the two wall thicknesses may be of the order of 1.0 mm. each, so that assembled the structure is relatively rigid, while individually each handle and the sleeve is relatively flexible. In the latter case, it will be noted that no thinning of the handle walls is required in the vicinity of the pushbutton. The integral neck-like extension 25 of the casing of this embodiment, as shown in Figure 7 or as so modified, may be exactly the same as in the first described embodiment, although a modification is here shown internally thereof, in which a labyrinth of spaced projections 39 is integral with the surfaces of the bore thereof, the projections being of such dimensions and number as to provide a watertight seal between the extension walls and the line conductors in the bore.

Disassembly of this last-described embodiment solely by pulling or bending forces is well-nigh impossible. To disassemble, the substantially bend-resistant assembly of handle casing 6 and sleeve 34, the casing 6 must be compressed at the dished regions 37, thus removing projections 35 from grooves 36, and thereupon substantially simultaneously pulling rib 32 from its yielding groove 33. It will be noted that the forces applied must be relatively high in that the resistance of the core sealing by the labyrinthine projections 38 in the neck-like extension must also be overcome.

By way of example of the other dimensions of the miniature immersion heater embodiments above described, the handle 6, including integral extension 25, may have an overall length of about 7.5 cm., with a width of 2.5 cm., and a height of 1.3 cm., in the handle region per se; the apertures 4 for the heater shanks a diameter of 4.5 mm.; the aperture 24 for the probe a diameter of about 2.2 mm.; and the cover-plate 30 including extension 31 and sleeve 34, a length of about 3.3 cm.

What I claim is:

1. A miniature portable electrical immersion heater comprising a handle including a bell-shaped casing of rectangular cross-section having walls of substantially uniform thickness with the region thereof at the open end of the casing having a lesser thickness, the casing being of a material selected from the group consisting of polyethylene, low pressure polyethylene, branched high pressure polyethylene and polypropylene, and a cover plate of the selected material tightly fitted into the open end of the casing, a miniature electrical immersion heater supported in the cover plate and external to the casing of which heater the electrical conductors extend into the casing, electric current leads extending watertight into the casing, and switching means within the casing interconnecting the heater electrical conductors and the leads, the casing wall thickness being such that except at the open end the casing is substantially rigid, the casing wall thinned portion at the open end being substantially flexible to facilitate fitting the cover-plate into the casing open end, and on insertion to hold it watertight therein.

2. The heater according to claim 1 in which an elongated hollow extension of the selected material is integral with the closed end of the casing, the wall thickness of the extension being less than that of the casing adjacent the casing and tapering to a minimum at the free end of the extension and such that the extension is flexible, the extension and the closed end of the casing defining a pair of longitudinal apertures of a diameter not in excess of that of the current leads through which the leads are drawn into the casing.

3. The heater according to claim 2 in which the elongated hollow extension has ribs on its internal surface of which the inner diameter is slightly less than the external diameter of the current leads.

4. The heater according to claim 1 in which the interconnecting switching means includes a fixed contact connected to one immersion heater conductor, a conductive springy bridge connected at its pivoting end to one current lead, a movable contact at the free end of the bridge, the bridge being prebiased normally to engage the movable to the fixed contact, an electrically and thermally non-conductive button carried by the bridge, a continuous thinned flexible portion of the casing wall registering with one end of the button and normally curved convex outwardly, a heat responsive element comprising a tube having a closed end at the immersion heater and extending through the cover-plate into the casing interior, a closed reservoir into which the tube opens in the casing interior, a flexible diaphragm comprising the wall of the closed reservoir adjacent the other end of the button, and a predetermined amount of thermally expansive liquid in the reservoir and tube so that at normal temperatures the diaphragm is at least flat relative to the adjacent end of the button and with increasing temperature the thermally expansive liquid exerts increasing pressure on the diaphragm until at a predetermined high temperature the diaphragm snaps convex outwardly of the reservoir moving the button and bridge and disengages the movable from the fixed contact and maintains them in disengagement until by finger pressure the thinned flexible casing wall portion is depressed and with it the button, the bridge and the diaphragm restoring the latter, the temperature of the thermally expansive liquid being less than the predetermined high temperature.

5. The heater according to claim 1 in which the cover-plate has integral therewith a sleeve of a length substantially equal to the length of the casing interior and the same cross-section as the casing and of a wall thickness sufficiently thin to render it flexible, the interconnecting switching means includes a fixed contact connected to one immersion heater conductor, a conductive springy bridge connected at its pivoting end to one current lead, a movable contact at the free end of the bridge, the bridge being prebiased normally to engage the movable to the fixed contact, an electrically and thermally non-conductive button carried by the bridge, the sleeve defining an aperture registering with the button, a continuous thinned flexible portion of the casing wall registering with the sleeve aperture and one end of the button and normally curved convex outwardly, a heat responsive element comprising a tube having a closed end at the immersion heater and extending through the cover-plate into the casing interior, a closed reservoir into which the tube opens in the casing interior, a flexible diaphragm comprising the wall of the closed reservoir adjacent the other end of the button, and a predetermined amount of thermally expansive liquid in the reservoir and tube so that at normal temperatures the diaphragm is at least flat relative to the adjacent end of the button and with increasing temperature the thermally expansive liquid exerts increasing pressure on the diaphragm until at a predetermined high temperature the diaphragm snaps convex outwardly of the reservoir moving the button and bridge and disengages the movable from the fixed contact and maintains them in disengagement until by finger pressure the thinned flexible casing wall portion is depressed and with it the button, the bridge and the diaphragm restoring the latter, the temperature of the thermally expansive liquid being less than the predetermined high temperature.

6. The heater according to claim 5 in which at least two opposite faces of the sleeve converge slightly at its free end region, a rib on the two opposite external faces of the sleeve at its free end region, each rib being of a height to make the total transverse dimension of the sleeve thereat somewhat larger than the corresponding transverse dimension of the interior of the casing, and grooves adapted to receive the ribs on insertion of the sleeve in the corresponding interior faces of the casing.

7. The heater according to claim 5 in which the wall thickness of the casing is reduced substantially to that of the sleeve so that the casing per se is flexible but the casing with inserted sleeve is rigid.

8. The heater according to claim 6 in which the opposite faces of the casing wall in the region registering with the position occupied by the two opposite faces of the free converging end region of the sleeve on full insertion thereof into the casing, are thinned and dished in advance of the region of the sleeve ribs to permit removal of the ribs from their grooves by the application of finger pressure for removal of the sleeve from the casing.

References Cited in the file of this patent

UNITED STATES PATENTS

| 2,061,190 | Ericson | Nov. 17, 1936 |
| 2,189,987 | Kellems | Feb. 13, 1940 |
| 2,479,587 | Morris et al. | Aug. 23, 1949 |
| 2,732,478 | Stiebel | Jan. 24, 1956 |
| 2,780,715 | Strokes | Feb. 5, 1957 |
| 2,849,590 | Stiebel | Aug. 26, 1958 |
| 2,888,547 | Saper | May 26, 1959 |
| 2,902,581 | Stiebel | Sept. 1, 1959 |

FOREIGN PATENTS

| 614,513 | Germany | June 11, 1935 |
| 1,110,246 | France | Oct. 5, 1955 |